US012565849B2

(12) United States Patent
Yu et al.

(10) Patent No.: US 12,565,849 B2
(45) Date of Patent: Mar. 3, 2026

(54) SPRAY GUIDED STRATIFICATION FOR FUELING A PASSIVE PRE-CHAMBER

(71) Applicant: ARAMCO SERVICES COMPANY, Houston, TX (US)

(72) Inventors: Xin Yu, New Hudson, MI (US); Anqi Zhang, Canton, MI (US); Andrew Baur, Whitmore Lake, MI (US); Nayan Engineer, Canton, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 245 days.

(21) Appl. No.: 18/050,342

(22) Filed: Oct. 27, 2022

(65) Prior Publication Data

US 2024/0141823 A1 May 2, 2024

(51) Int. Cl.
*F02B 19/10* (2006.01)

(52) U.S. Cl.
CPC ........ *F02B 19/108* (2013.01); *F02B 19/1014* (2013.01)

(58) Field of Classification Search
CPC .... F02B 19/108; F02B 19/1014; F02B 19/10; F02B 19/18; F02B 23/101; F02B 19/12; F02D 41/3094; F02D 41/402
See application file for complete search history.

(56) References Cited

U.S. PATENT DOCUMENTS 9,353,674 B2 * 5/2016 Bunce ................. F02B 19/1057
9,856,835 B1 1/2018 Coldren et al.
9,879,624 B2 1/2018 Tanaka
9,976,497 B2 5/2018 Matsumoto et al.
10,066,580 B2 9/2018 Assanis et al.
10,161,296 B2 12/2018 Schock et al.
10,422,288 B1 * 9/2019 Hamad .................. F02B 11/00
11,060,443 B1 * 7/2021 Thomas ................. F02M 61/14
11,156,147 B1 10/2021 Yu et al.
11,236,662 B2 * 2/2022 Zhang ..................... F02B 19/10
11,300,038 B2 4/2022 Seba et al.
(Continued)

FOREIGN PATENT DOCUMENTS

CN 113756932 A 12/2021
DE 1526290 A1 4/1970
DE 102018000285 A1 7/2019
DE 102020110960 A1 10/2020
(Continued)

OTHER PUBLICATIONS

Hua, et al., "Operation strategy optimization of lean combustion using turbulent jet ignition at different engine loads," Applied Energy, Aug. 14, 2021, 15 pages.
(Continued)

*Primary Examiner* — Xiao En Mo
(74) *Attorney, Agent, or Firm* — Osha Bergman Watanabe & Burton LLP

(57) ABSTRACT

An engine includes an engine block having a cylinder, a piston movably disposed in a main chamber of the cylinder, a prechamber adjacent to and in fluid communication with the main chamber via a prechamber nozzle, and a fuel injector in fluid communication with the main chamber, wherein the fuel injector has spray nozzles interfacing with the main chamber. The fuel injector and the prechamber are aligned such that a first nozzle of the spray nozzles is directed towards the prechamber nozzle.

19 Claims, 8 Drawing Sheets

(56) References Cited

U.S. PATENT DOCUMENTS

| | | | | |
|---|---|---|---|---|
| 11,371,419 | B2 | 6/2022 | Zhang et al. | |
| 11,459,995 | B1 | 10/2022 | Zyada et al. | |
| 2009/0292442 | A1* | 11/2009 | Leone | F02B 17/005 123/575 |
| 2012/0103302 | A1 | 5/2012 | Attard | |
| 2014/0251281 | A1* | 9/2014 | Nakano | F02D 41/3094 123/478 |
| 2014/0297162 | A1* | 10/2014 | Surnilla | F02D 41/065 123/406.47 |
| 2017/0022926 | A1* | 1/2017 | Sanborn | F02D 41/3094 |
| 2017/0314456 | A1* | 11/2017 | Blaxill | F02B 19/1028 |
| 2018/0334984 | A1* | 11/2018 | Thomas | F02D 41/402 |
| 2019/0145338 | A1 | 5/2019 | Tanaka et al. | |
| 2020/0040807 | A1* | 2/2020 | Aoki | F02B 23/10 |
| 2020/0182217 | A1* | 6/2020 | Keum | H05H 1/2406 |
| 2021/0363913 | A1 | 11/2021 | Schock | |
| 2022/0003146 | A1* | 1/2022 | Zhang | F02B 19/18 |

FOREIGN PATENT DOCUMENTS

| | | | |
|---|---|---|---|
| DE | 102020117008 | A1 | 12/2021 |
| JP | 2019157638 | A | 9/2019 |

OTHER PUBLICATIONS

Schumacher et al., "Pre-chamber Ignition System for Homogeneous Lean Combustion Processes with Active Fuelling by Volatile Fuel Components," Thesis, Dec. 14, 2018, 19 pages.

Office Action Issued in Related U.S. Appl. No. 18/050,330, Mailed Sep. 1, 2023, 15 pages.

Peters, N. et al., "Optimization of Lambda across the Engine Map for the Purpose of Maximizing Thermal Efficiency of a Jet Ignition Engine," SAE International Journal of Advances and Current Practices in Mobility, vol. 2, No. 6, pp. 3140-3150, Nov. 30, 2020 (11 pages).

Duan, W. et al., "Effects of passive pre-chamber jet ignition on combustion and emission at gasoline engine," Advances in Mechanical Engineering 2021, vol. 13, No. 12, pp. 1-10, Dec. 1, 2021 (10 pages).

Habermann, K. et al., "Development of a pre-chamber for ultra-lean operation of gasoline engines," Proceedings of 8th Transport Research Arena TRA 2020, Mar. 11, 2020 (10 pages).

Yu, X. et al., "Development of a Turbulent Jet-Controlled Compression Ignition Engine Concept using Spray-Guided Stratification for Fueling a Passive Prechamber," SAE International Journal of Engines, vol. 17, No. 4, Jan. 24, 2024 (22 pages).

International Search Report issued in corresponding International Application No. PCT/US2023/077791; mailed Feb. 29, 2024 (7 pages).

Written Opinion of the International Searching Authority issued in corresponding International Application No. PCT/US2023/077791; dated Feb. 29, 2024 (9 pages).

International Search Report issued in International Application No. PCT/US2023/077795 dated Feb. 27, 2024 (5 pages).

Written Opinion issued in International Application No. PCT/US2023/077795 dated Feb. 27, 2024 (6 pages).

* cited by examiner

SPRAY GUIDED STRATIFICATION FOR FUELING A PASSIVE PRE-CHAMBER

BACKGROUND

Internal combustion engines may generally operate by combusting a fuel mixture within a combustion chamber, where the combustion may force movement of one or more components in the engine. A typical internal combustion engine may include multiple cylinders defining the combustion chambers within an engine block, where combustion within a cylinder moves an internal piston, which may in turn move a crankshaft of the engine. A fuel mixture may be directed through an inlet into the combustion chamber and combusted.

Combustion within a combustion chamber of an internal combustion engine may be generated using different mechanisms, such as using high pressure and high temperature conditions or using an ignition device. A common ignition device set up requires a continuous ignition source, or spark, to be produced such that combustion is created by sparking an air and fuel mixture in the combustion chamber of the engine. Conventionally, the spark is created by energizing a copper ignition rod and placing the energized ignition rod within a set distance to a grounded nickel or iridium plate, where the electrical difference between the energized ignition rod and the grounded plate creates a continuous spark. Alternatively, a portion of the air and fuel mixture may be ignited in a pre-combustion chamber, where the air and fuel mixture is ignited and the resulting combustion reaction is released into the main combustion chamber to ignite the remainder of the air and fuel mixture. After combustion within the combustion chamber, the combustion products may exit an outlet of the combustion chamber as exhaust.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to engines that include an engine block having a cylinder, a piston movably disposed in a main chamber of the cylinder, a prechamber adjacent to and in fluid communication with the main chamber via a nozzle, and a fuel injector in fluid communication with the main chamber, wherein the fuel injector has spray nozzles interfacing with the main chamber, and wherein the fuel injector and the prechamber are aligned such that a first nozzle of the spray nozzles is directed towards the nozzle of the prechamber.

In another aspect, embodiments disclosed herein relate to a prechamber injection method that includes providing an engine having an engine block with at least one cylinder, a piston movably disposed in a main chamber of the cylinder, a prechamber adjacent to and in fluid communication with the main chamber via a prechamber nozzle, and a fuel injector having spray nozzles interfacing with the main chamber of the cylinder. The method may also include spraying fuel from a first nozzle of the spray nozzles in a first direction towards the prechamber nozzle such that a first amount of fuel enters the prechamber nozzle. While spraying fuel from the first nozzle, fuel may also be sprayed from a second nozzle of the spray nozzles in a second direction, different than the first direction, into the main chamber.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to spray guided stratification for passive prechamber fueling. In another aspect, embodiments disclosed herein relate to a prechamber attached to and in fluid communication with a main chamber, where a fuel injector connected to the main chamber has one or more spray nozzles aligned with a nozzle of the prechamber. In yet another aspect, embodiments disclosed herein relate to a method of passively fueling a prechamber via alignment of a fuel injector fuel spray and a nozzle of the prechamber.

Figure 1:
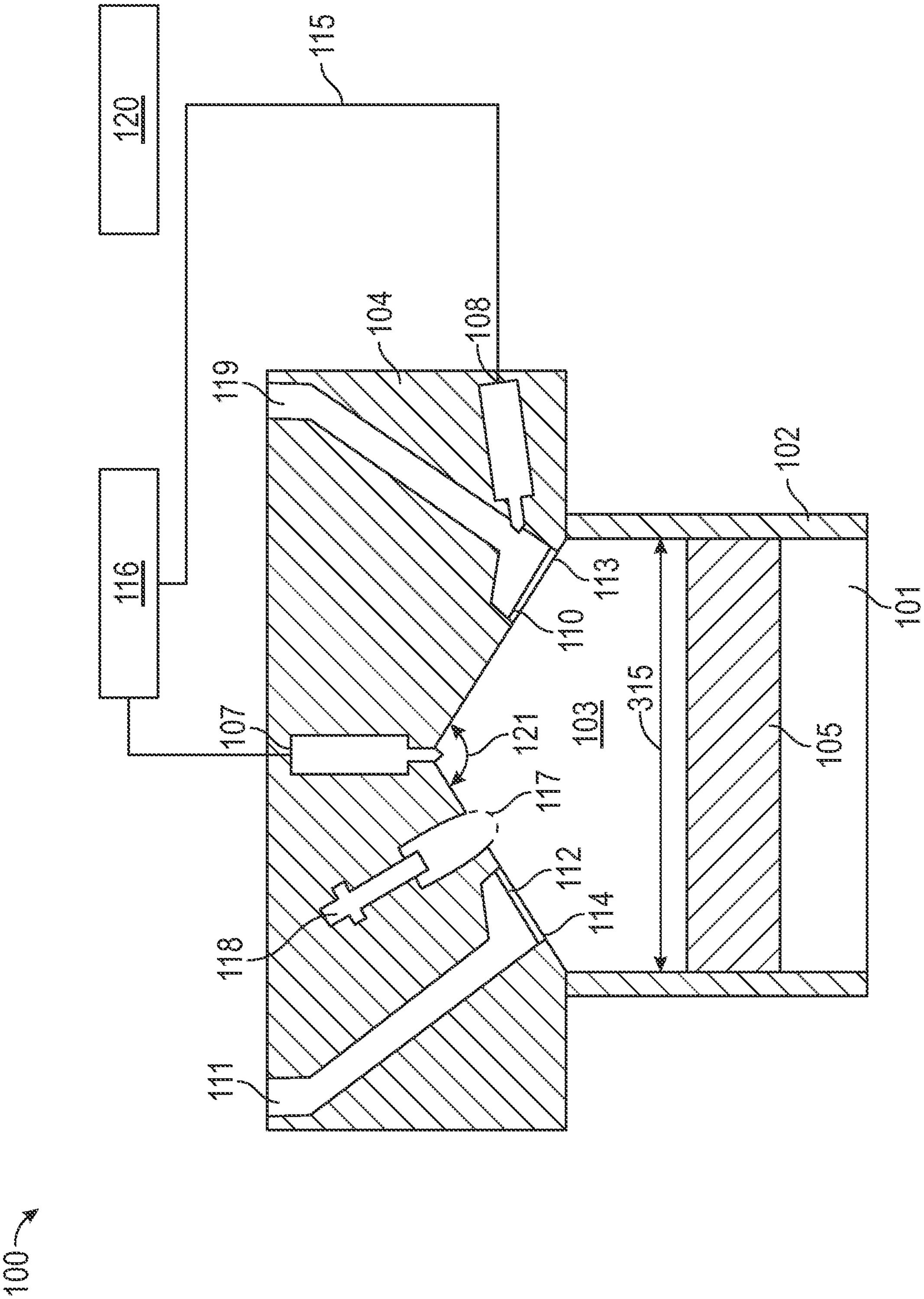
FIG. 1 shows a combustion system is accordance with one or more embodiments.

Referring to FIG. 1, a combustion system 100 in accordance with embodiments disclosed herein is illustrated. The combustion system 100 may be an internal combustion engine including at least one cylinder 101 formed within an engine body or engine block 102. In FIG. 1, only a portion of the engine block is shown, and only one cylinder in the engine block is shown, although an engine block may have several cylinders. The cylinder 101 may have an engine bore diameter 315 defined between the side walls of the cylinder (which may or may not include an engine liner). A main chamber 103 formed within the cylinder 101 may be a combustion chamber of the combustion system 100. Additionally, a cylinder head 104 may be mounted at a top of the cylinder 101 and forms an upper end of the main chamber 103. In one or more embodiments, the cylinder head 104 may have a pent-roof angle 121 between 90 and 150 degrees. However, there may be other embodiments in which the cylinder head 104 may have different geometry. A piston 105 may be arranged inside the cylinder 101 and forms a lower end of the main chamber 103. The piston 105 moves up and down inside the cylinder 101 during an engine cycle, and the volume of the main chamber 103 changes with the position of the piston 105. Further, the piston 105 may be connected to a crankshaft (not shown) by a connecting rod. The crankshaft may convert the reciprocating motion of the piston 105 into rotary motion, as is well known in the art.

A prechamber 117 may be positioned in fluid communication with the main chamber 103. The prechamber 117, in accordance with one or more embodiments, may have a much smaller volume than the main chamber 103. For example, in one or more embodiments, the prechamber 117 may have a volume equal to between 1% and 10% of the engine clearance volume, which may refer to the volume between the cylinder head 104 and the piston 105 when the piston 105 is at a top dead center position. In one or more embodiments, the external surface geometry of the prechamber 117 interfacing with the main chamber 103 may be a flat surface, a concave surface, or a convex surface, all of which may affect flow characteristics of the fuel spray and the volume of fuel spray which may enter the prechamber 117 under a given combustion strategy.

The prechamber 117 may have one or more nozzles integrally formed through a wall of the external surface of the prechamber 117, such that the one or more nozzles provide for fluid communication between the prechamber 117 and the main chamber 103. In some embodiments, the nozzles may be a hole having a selected shape formed through the prechamber wall. In some embodiments, the nozzles may be separate nozzle inserts that are inserted into and attached to a hole formed through the prechamber wall. In one or more embodiments, the prechamber 117 may have between 1 and 12 nozzles. The one or more nozzles are configured to accelerate fuel as it passes from the main chamber 103 to the prechamber 117, which may improve vaporization and mixing of the fuel. A spark plug 118 may be connected to and configured to interface with the prechamber 117. For example, the spark plug 118 may be provided in the cylinder head 104 to interface with an end of the prechamber 117 opposite the main chamber 103. The spark plug 118 may be used to ignite fuel within the prechamber 117 before the ignited fuel may be jetted through the one or more nozzles and into the main chamber 103.

A fuel injector 107 according to embodiments of the present disclosure may be mounted in the cylinder head 104. A clamp (not pictured) may removably fix the fuel injector 107 to the cylinder head 104. The clamp may be disposed on a top of the fuel injector 107 and be attached to the cylinder head 104 to maintain a position of the fuel injector 107. The fuel injector 107 may be aligned and coaxial or angled with respect to a cylinder axis of the cylinder head 104. In one example, installation of the fuel injector 107 to the cylinder head 104 includes providing one or more spray nozzle assemblies at a tip of the fuel injector. In some embodiments, a nozzle assembly may include a fuel channel, a premixing tube, and a port formed inside a tip of the fuel injector 107. The fuel injector 107 may be in fluid communication with the main chamber 103, such that the one or more spray nozzle assemblies may be in a position where an orifice of the spray nozzle assemblies are in fluid communication to the main chamber 103.

In one or more embodiments, the one or more spray nozzle assemblies may have a wide spray umbrella angle. A first of the one or more spray nozzle assemblies may be directed towards and aligned with one of the nozzles of the prechamber 117. This first spray nozzle assembly may be configured to passively fuel the prechamber 117 while actively fueling the main chamber 103.

Still referring to FIG. 1, the cylinder head 104 may optionally include a second fuel injector 108 used in combination with the fuel injector 107. As shown, the cylinder head 104 may include at least one intake passage 119 terminating in a second intake port 110. A second fuel injector 108 may be positioned along the intake passage 119 in a configuration allowing injection of fuel into the intake passage 119. The second fuel injector 108 may be a similar fuel injector as the fuel injector 107. Additionally, an intake port 110 may include an intake valve 113 to control opening and closing of the intake port 110. Air flowing through the intake passage 119 to the main chamber 103 may be entrained in the fuel spray plume of the second fuel injector 108 when the second fuel injector 108 is injecting fuel. Although not shown, the main chamber 103 and the intake passage 119 may be connected to a source of air in a conventional manner. The air in the main chamber 103 and the intake passage 119 may be ambient air or a mixture of ambient air and recirculated exhaust gases.

The cylinder head 104 may also include at least one exhaust passage 111 having in an exhaust port 112. An exhaust valve 114 may be arranged to control opening and closing of the exhaust port 112. When the exhaust port 112 is open, exhaust gases can be pushed out of the main chamber 103 into the exhaust passage 111. An intake passage 119, an exhaust passage 111 and associated components (e.g., valves 113, 114 and fuel injectors 107, 108) may be provided in the cylinder head 104 for each cylinder in the combustion system 100, such as in the arrangement shown in FIG. 1 for the cylinder 101.

In one or more embodiments, the fuel injector(s) 107, 108 may be used to directly inject fuel into the main chamber 103 and/or intake passage 119. The fuel injector(s) 107, 108 may be fluidly connected to a fuel line 115, which is in communication with a fuel supply 116.

In one or more embodiments, a computer 120 may include a control system, such as an engine control unit, which may control an opening and closing of the fuel injector(s) 107, 108 to deliver the fuel into the main chamber 103 at desired times during an engine cycle. The control system may also control opening and closing of the intake and exhaust valves 113, 114. In one or more embodiments, the computer 120 may include a processor and a user interface panel at which a user may provide an input, such as a command, to the computer 120.

In some embodiments, a cable (not shown), such as an electrical or hydraulic power cable, may be coupled to the fuel injector(s) 107, 108. The cable may provide power to the fuel injector(s) 107, 108 from a power source (not shown). Additionally, the cable may be connected to the computer 120 to control the fuel injector(s) 107, 108. The computer 120 may include instructions or commands to operate the fuel injector(s) 107, 108 automatically or a user may manually control the computer 120 at a user interface panel (not shown). It is further envisioned that the computer 120 may be connected to an office via a satellite such that a user may remotely monitor conditions and send commands to the fuel injector(s) 107, 108. If leaks and performance issues are found, an alert may be sent to the control system to adjust or turn off the fuel injector(s) 107, 108 manually or automatically.

In one or more embodiments, the combustion system 100 may be used to perform turbulent jet-controlled compression ignition (TJCCI). TJCCI may involve passively fueling the prechamber 117 and igniting the fuel within the prechamber 117. The ignited fuel may then be jetted through one or more of the plurality of the nozzles from the prechamber 117 into the main chamber 103.

Figure 2:
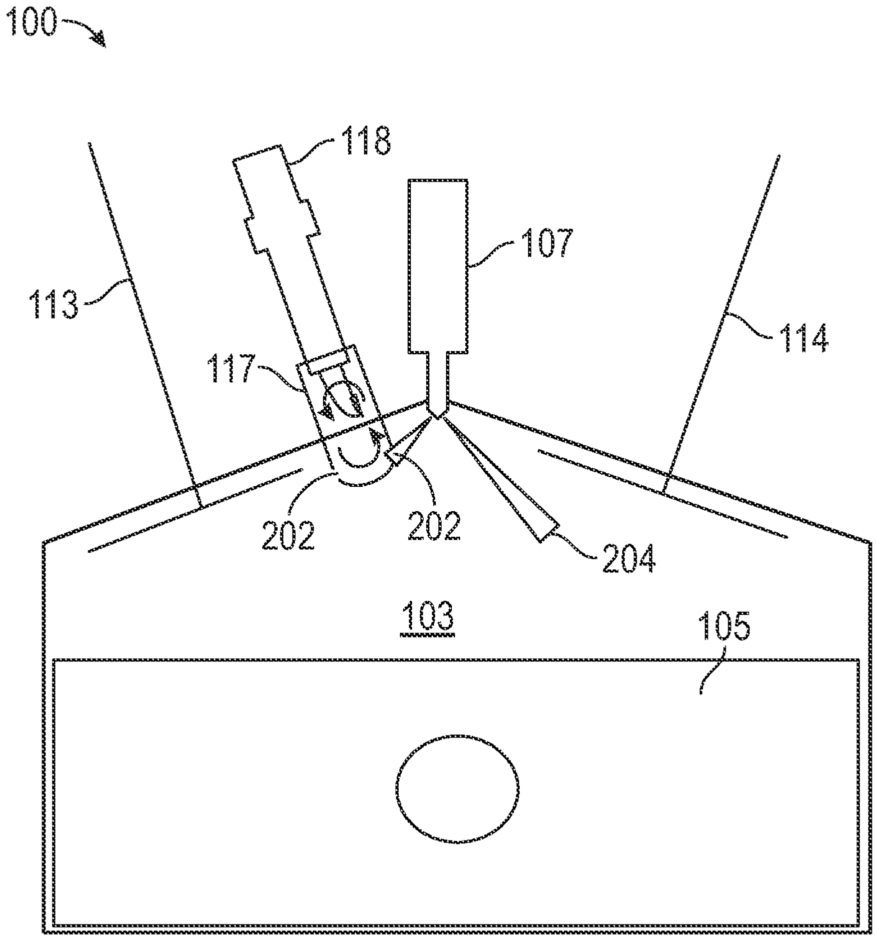
FIG. 2 shows a combustion system in accordance with one or more embodiments.

Turning now to FIG. 2, FIG. 2 shows a combustion system in accordance with one or more embodiments. As discussed in FIG. 1, the prechamber 117 may have a plurality of nozzles 202 through which fuel may enter and exit the prechamber 117. The plurality of nozzles 202, in accordance with one or more embodiments, allow for acceleration and vaporization of fuel as it enters the prechamber 117 from the main chamber 103. This may allow for improved mixing within the prechamber 117.

In one or more embodiments, the fuel injector 107 may have one or more spray nozzles, through which one or more fuel sprays 204 may be propelled. A first of the fuel sprays 204 may be directed towards one of the plurality of nozzles 202, such that a volume of fuel may enter the prechamber 117. Another of the fuel sprays 204 may be directed towards the main chamber 103. In one or more embodiments, the direction of the first fuel spray 204 may be different to the directions of the other fuel sprays 204.

Figure 3A:
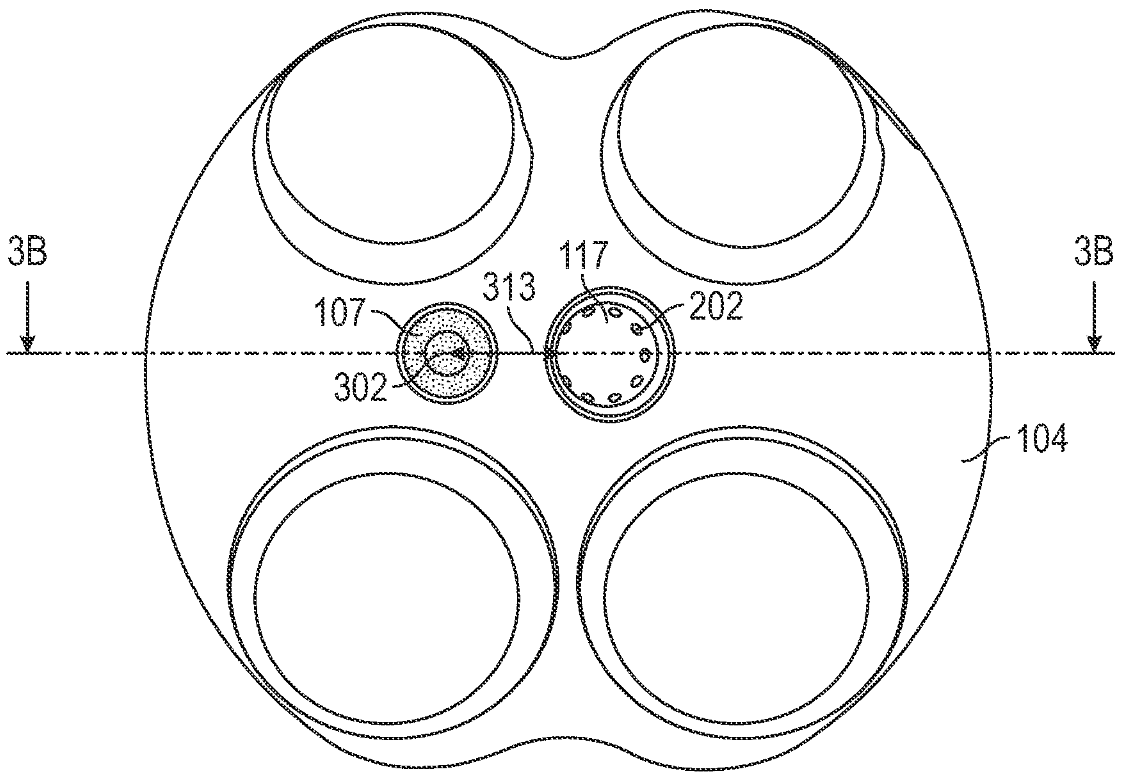
FIGS. 3A-B show a prechamber and fuel injection alignment in accordance with one or more embodiments.
Figure 3B:
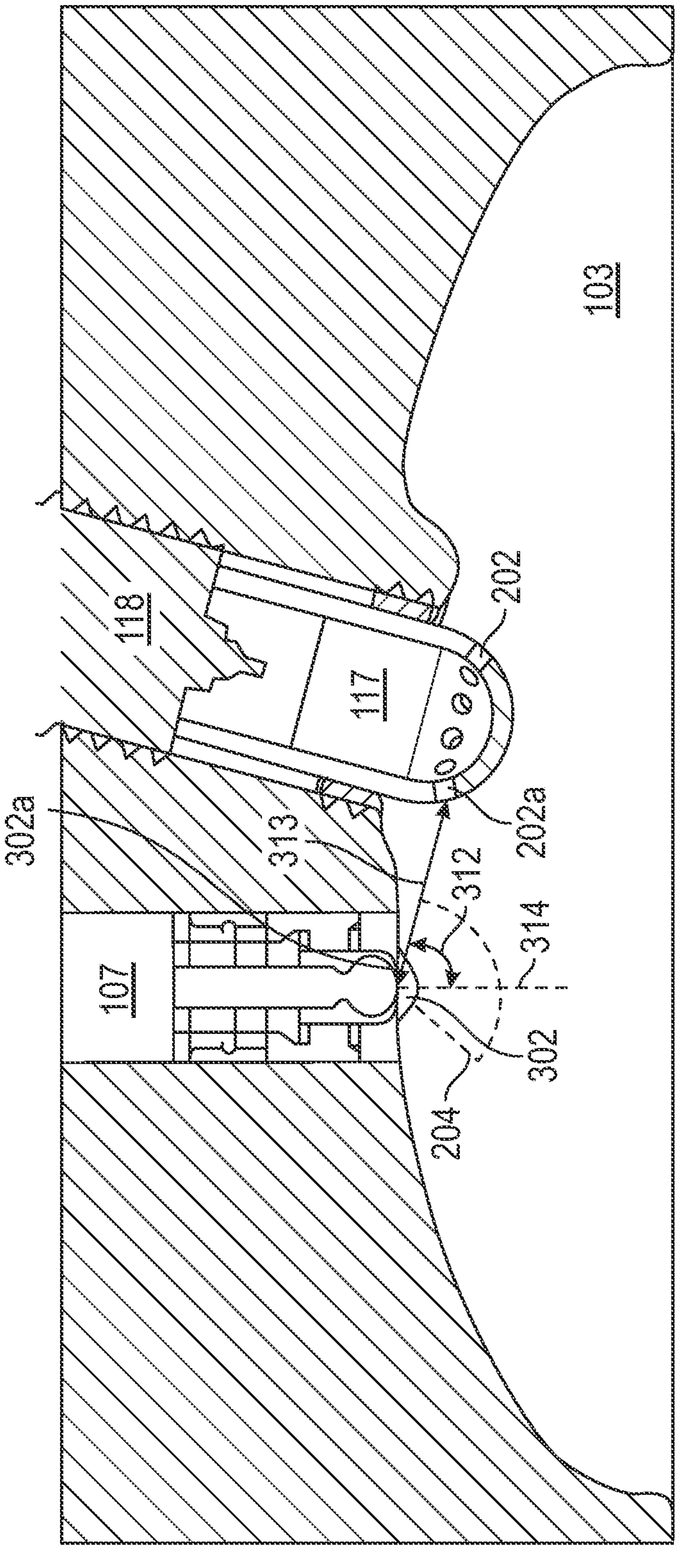

Turning now to FIGS. 3A-B, FIGS. 3A-B shows the alignment of the prechamber nozzles and the fuel injector spray nozzles in accordance with one or more embodiments. FIG. 3A shows a top view of the interior surface of the cylinder head 104 having the fuel injector 107 and prechamber 117 protruding from the interior surface and positioned between intake and exhaust valves. FIG. 3B shows a cross-sectional view of the engine assembly shown in FIG. 3A, taken along cross-section A-A in FIG. 3A.

The fuel injector 107 may have one or more spray nozzles 302 through which fuel may be dispensed, and the prechamber 117 may have one or more nozzles 202 through which fuel sprayed from the fuel injector 107 may be received. Depending on the engine size, the fuel injector 107 and the prechamber 117 may be spaced apart from each other, such that a first fuel injector nozzle 302*a* and a first prechamber nozzle 202*a* aligned with the first fuel injector nozzle 302*a* are a distance apart ranging from about 1% to 20% of the engine bore diameter 315 (shown in FIG. 1).

Each of the fuel injector spray nozzles 302 may have different nozzle sizes and spray angles (also referred to as a spray umbrella angles). In contrast to commercially available spray nozzles, spray nozzles 302 disclosed herein may provide wider spray umbrella angles to appropriately target one of the plurality of nozzles 202 in the prechamber 117. A spray umbrella angle may be measured as the angle across an outer diameter of a fuel spray 204 being ejected from the spray nozzles 302. Accordingly, a half spray umbrella angle 312 may be measured between the outer diameter of the spray plume from the fuel injector 107 and a central axis 314 of the fuel injector 107, as best seen in FIG. 3B. According to embodiments of the present disclosure, at least one nozzle 302 of the fuel injector 107 may be oriented to align with at least one prechamber nozzle 202, represented in FIG. 3B by the spray alignment path 313, which may provide a wider spray umbrella angle when compared with conventional fuel injector fuel sprays. For example, as shown in FIG. 3B, a first fuel injector nozzle 302*a* may be oriented to align with and face a first prechamber nozzle 202*a*, such that fuel sprayed from the first fuel injector nozzle 302*a* may flow along the spray alignment path 313 to enter the first prechamber nozzle 202*a*. The half spray umbrella angle 312 provided by the first fuel injector nozzle 302*a* may be larger than the half spray umbrella angle provided by the remaining fuel injector nozzles 302, such that the overall spray umbrella angle from the fuel injector 107 may be larger than that provided by conventional fuel injectors.

Conventional central or top mounted fuel injectors for gasoline engines may have a spray umbrella angle ranging from 30 to 90 degrees to avoid spraying fuel onto the engine liner and associated oil dilution. While one or more nozzles 302 of a fuel injector 107 according to embodiments disclosed herein may be oriented to provide the same spray umbrella angle as conventional fuel injectors, at least one fuel injector nozzle 302*a* aligned with a prechamber nozzle 202*a* may provide a larger spray umbrella angle. For example, according to embodiments of the present disclosure, a first fuel injector nozzle 302*a* aligned with a first prechamber nozzle 202*a* may provide a spray umbrella angle ranging from about 100 to 130 degrees. According to embodiments of the present disclosure, the wider spray from such nozzle configuration may be limited to a shorter duration than conventionally used, which may avoid fuel spray from reaching the engine liner and associated oil dilution. Further, performing double injection events per cylinder cycle may allow for use of shorter spray durations while also providing the same or similar amount of total fuel injection per cycle.

In one or more embodiments, each of the plurality of nozzles 202 may be designed to appropriate accelerate and vaporize fuel from the first fuel spray 204. The prechamber nozzles 202 may be formed as apertures in the prechamber wall or may be separate nozzle inserts inserted through and attached to the prechamber wall. In some embodiments, to increase the chance of air fuel mixture flow into the prechamber, the nozzles may have a lip or bump formed around the perimeter of the nozzle outer orifice to capture the spray plume from the fuel injector. Additionally, prechamber nozzles 202 may have small diameters, e.g., ranging from about 0.9 to 1.1 mm, which may be designed to increase the velocity and turbulence level of the air fuel mixture driven through the nozzle 202 by the pressure difference between main chamber and prechamber due to piston compression. Such increase in velocity and turbulence level of the air fuel mixture through the nozzles 202 may improve fuel vaporization.

As described above, in one or more embodiments, a first prechamber nozzles 202*a* and a first fuel injector spray nozzle 302*a* may be aligned, such that fuel dispensed from the first spray nozzle 302*a* may enter the prechamber 117 via the first prechamber nozzle 202*a*. According to embodiments of the present disclosure, to provide such nozzle alignment, the fuel injector 107 and prechamber 117 hardware may be provided with stoppers and/or constrains that fit within and/or interlock with corresponding receptacles in the engine head to hold the fuel injector and prechamber nozzles in alignment upon installing the fuel injector and prechamber in the engine.

Figure 4:
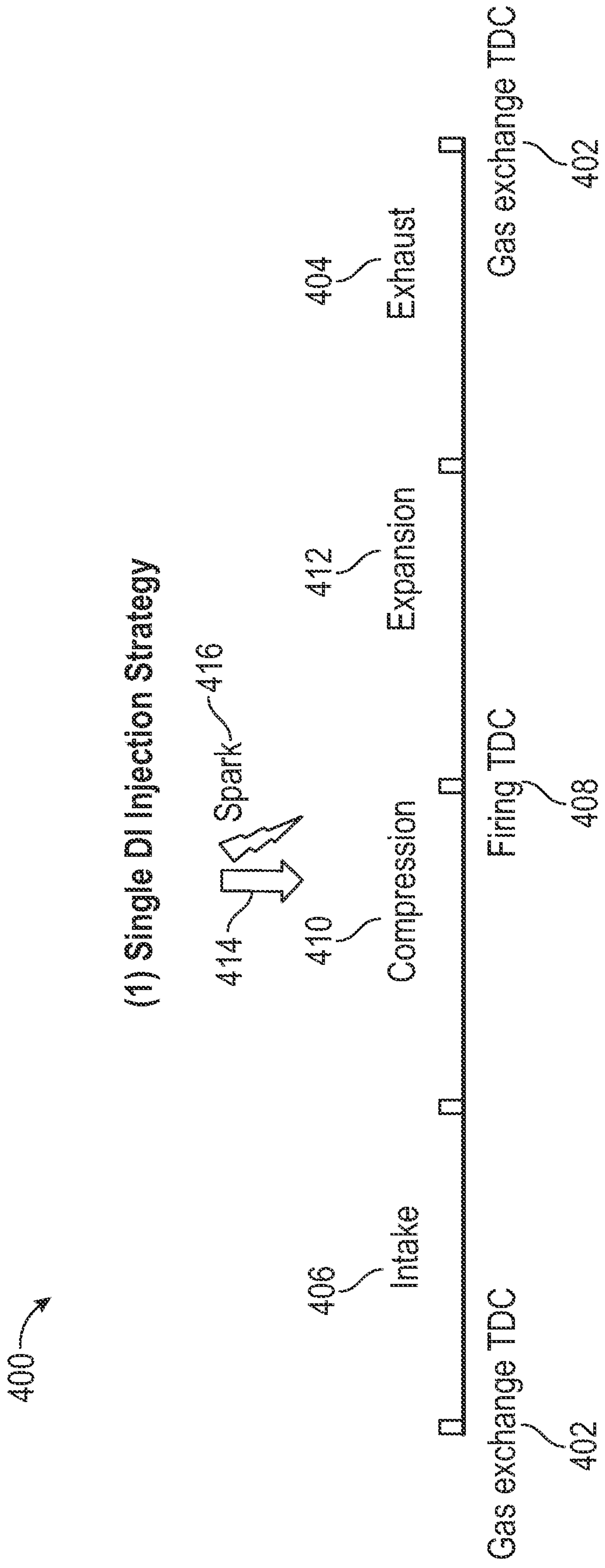
FIG. 4 shows an engine timing chart in accordance with one or more embodiments.

Turning now to FIG. 4, FIG. 4 shows an engine timing chart 400 for a single direct injection combustion strategy in accordance with one or more embodiments. An engine timing chart, such as engine timing chart 400, may represent the four strokes of the engine (exhaust, intake, compression, and expansion) and the respective timing of actuation of the exhaust and intake valves, the timing of fuel injection, and the timing of the spark. Referring back to FIG. 1, in one or more embodiments, each cycle of the engine may correspond to two revolutions (four strokes) of the piston 105 within the cylinder 101. Accordingly, there may be two instances at which the piston 105 may reach a top dead center position: a gas exchange top dead center 402, located between the exhaust stroke 404 and the intake stroke 406, and a firing top dead center 408, located between the compression stroke 410 and the expansion stroke 412.

Referring to FIGS. 1 and 4, a single direct injection combustion strategy may involve a fuel injection 414 via fuel injector 107 late in the compression stroke 410. A spark 416 may be produced by the spark plug 118 immediately after the fuel injection 414 and immediately prior to the piston 105 reaching a firing top dead center position 408.

Figure 5:
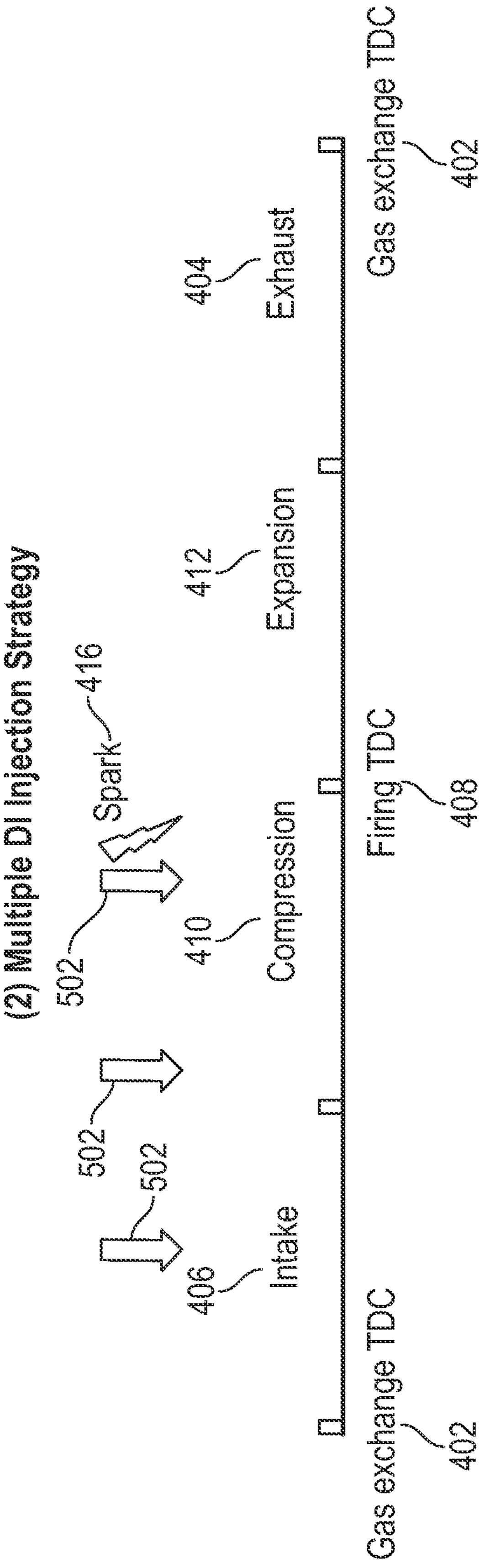
FIG. 5 shows an engine timing chart in accordance with one or more embodiments.

Turning now to FIG. 5, FIG. 5 shows an engine timing chart 500 for a multiple direct injection combustion strategy in accordance with one or more embodiments. Referring to FIGS. 1 and 5, a multiple direct injection combustion strategy may include multiple fuel injections 502 by fuel injector 107 in both the intake stroke 406 and the compression stroke 410. A spark 416 may be produced by the spark plug 118 immediately prior to the firing top dead center 408.

Figure 6:
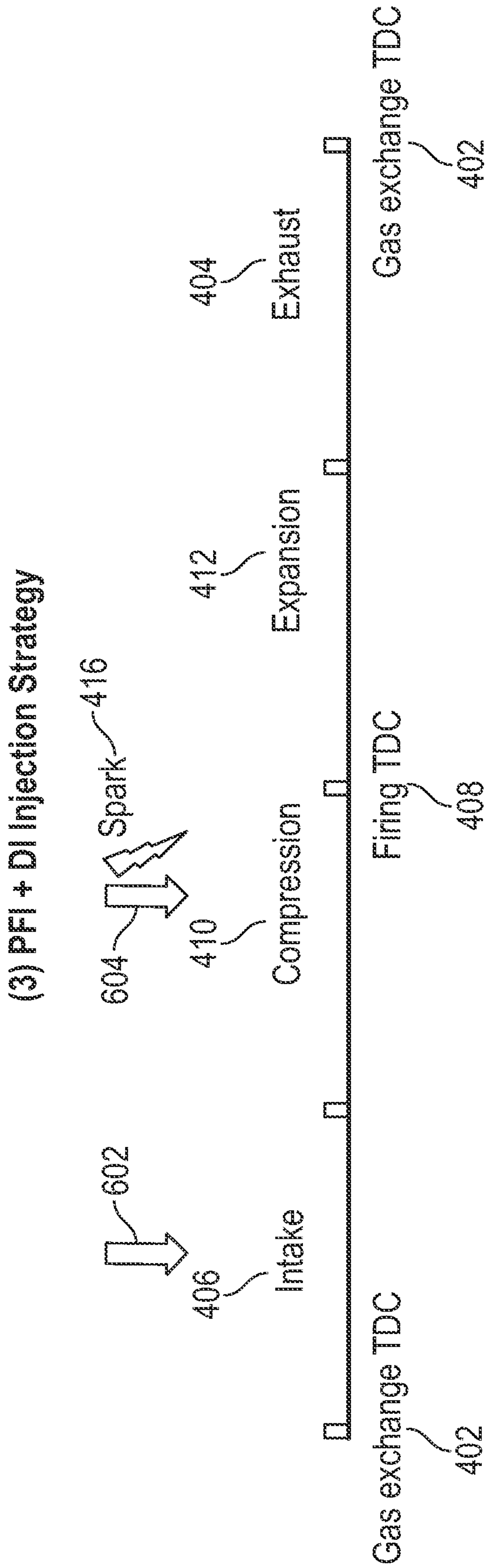
FIG. 6 shows an engine timing chart in accordance with one or more embodiments.

Turning now to FIG. 6, FIG. 6 shows an engine timing chart 600 for a port fuel injection and direct injection combustion strategy in accordance with one or more embodiments. Referring to FIGS. 1 and 6, a port fuel injection and direct injection combustion strategy may include a port fuel injection 602 via fuel injector 108 during the intake stroke 406 and a direct fuel injection 604 by fuel injector 107 in the compression stroke 410. A spark 416 may be produced by the spark plug 118 immediately prior to the firing top dead center 408.

In each of the combustion strategies described in FIGS. 4-6, the fuel injector 107 may have multiple spray nozzles 302 or a single spray nozzle 302, which may reduce fuel stratification in the main chamber 103 for reduced nitrogen oxide emissions. The one or more spray nozzles 302 may be sized so that the hydraulic fuel rate of the fuel through the spray nozzles 302 matches the amount of stratified fuel needed. Further, each of the one or more spray nozzles 302 may have a spray behavior which matches the distance between the spray nozzle 302 and the nozzle 202 of the prechamber 117 to avoid liquid impingement while maintaining vapor impingement. The one or more spray nozzles 302 may have a wide umbrella angle, such as angle 121 depicted in FIG. 1, to allow for proper alignment with the nozzles 202 of the prechamber 117.

Figure 7:
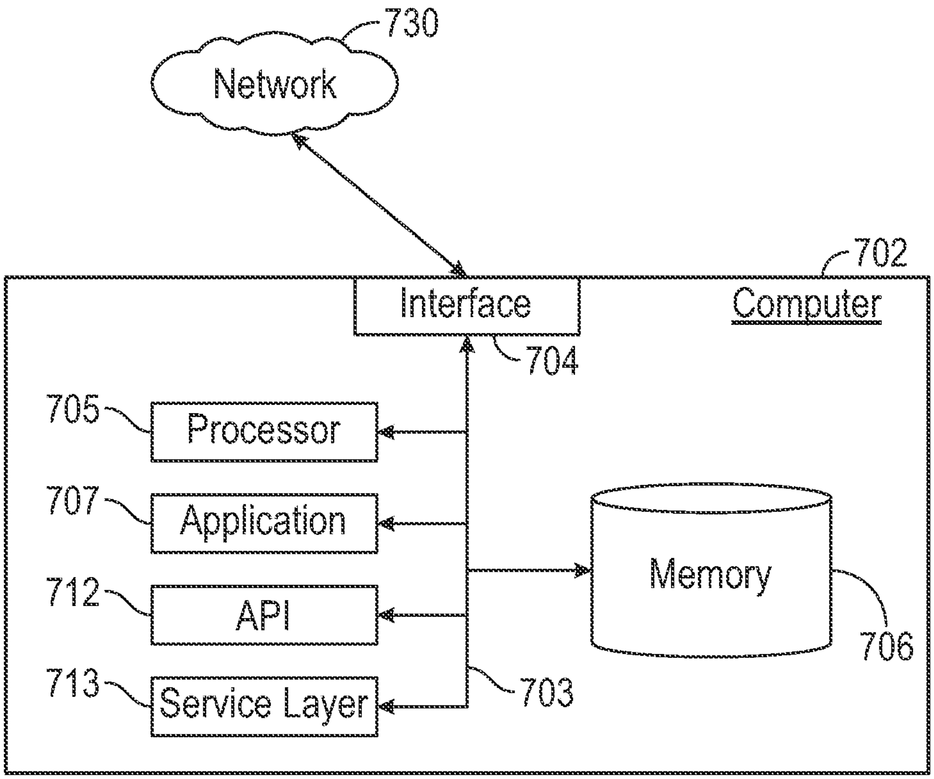
FIG. 7 shows a computer system in accordance with one or more embodiments.

FIG. 7 depicts a block diagram of a computer system 702 used to provide computational functionalities associated with described algorithms, methods, functions, processes, flows, and procedures as described in this disclosure, according to one or more embodiments. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may include a computer that includes an input device, such as a keypad, keyboard, touch screen, or other device that can accept user information, and an output device that conveys information associated with the operation of the computer 702, including digital data, visual, or audio information (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713. The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or another suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730. Generally, the interface 704 includes logic encoded in software or hardware (or a combination of software and hardware) and operable to communicate with the network 730. More specifically, the interface 704 may include software supporting one or more communication protocols associated with communications such that the network 730 or interface's hardware is operable to communicate physical signals within and outside of the illustrated computer 702.

The computer 702 includes at least one computer processor 705. Although illustrated as a single computer processor 705 in FIG. 7, two or more processors may be used according to particular needs, desires, or particular implementations of the computer 702. Generally, the computer processor 705 executes instructions and manipulates data to perform the operations of the computer 702 and any machine learning networks, algorithms, methods, functions, processes, flows, and procedures as described in the instant disclosure.

The computer 702 also includes a memory 706 that holds data for the computer 702 or other components (or a combination of both) that can be connected to the network 730. For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing a computer 702, wherein each computer 702 communicates over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

Figure 8:
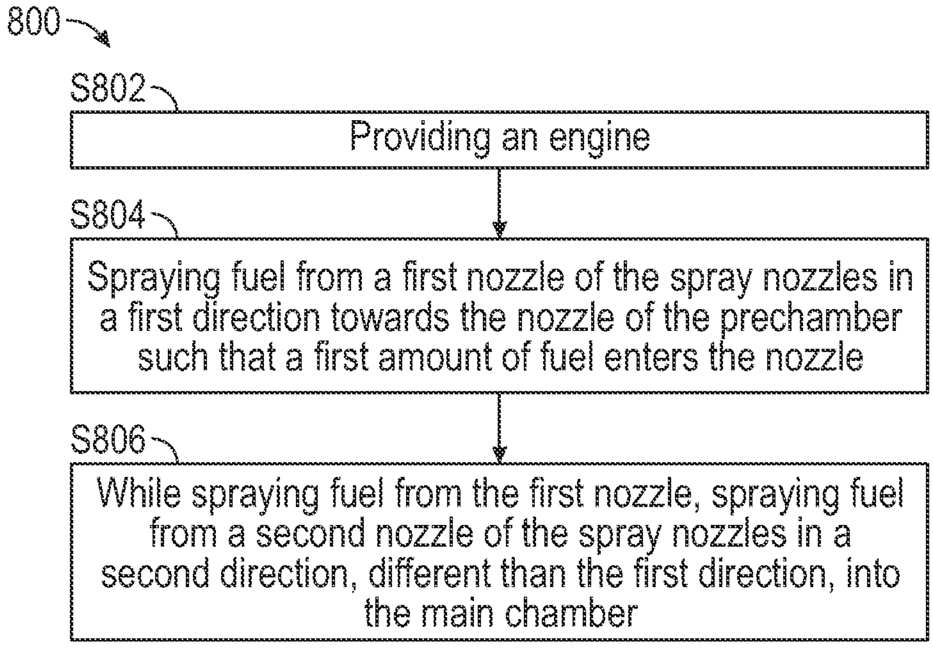
FIG. 8 shows a flowchart of a method in accordance with one or more embodiments.

FIG. 8 depicts a flowchart in accordance with one or more embodiments. More specifically, FIG. 8 depicts a flowchart 800 of a prechamber injection method. Further, one or more blocks in FIG. 8 may be performed by one or more components as described in FIGS. 1-7. While the various blocks in FIG. 8 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, an engine may be provided, S802. In one or more embodiments, the engine may have an engine block 102 with a cylinder 101, and a piston 105 movably disposed in a main chamber 103 of the cylinder 101. The engine may also have a prechamber 117 adjacent to and in fluid communication with the main chamber 103 via a nozzle 202 and a fuel injector 107 in fluid communication with the main chamber 103. In one or more embodiments, the fuel injector 107 has spray nozzles 320 interfacing with the main chamber 103, such that a first nozzle of the spray nozzles 302 is directed towards the nozzle 202 of the prechamber.

Fuel may be sprayed from a first nozzle of the spray nozzles 302 in a first direction towards the nozzle 202 of the prechamber 117, S804. Fuel may also be sprayed in a second direction from a second nozzle of the spray nozzles 202 into the main chamber 103, S806. In one or more embodiments, the first direction may be different to the second direction. In one or more embodiments, a consistent flow direction may be created from the main chamber 103 to the prechamber 117 during a compression stroke 410 of the piston 105.

In one or more embodiments, the method described in flowchart 800 may also include controlling an equivalence ratio of a fuel air mixture within the main chamber 103 with an injection timing and an injection duration. An equivalence ratio may refer to the ratio of fuel to air within the main chamber 103. In one or more embodiments, the injection timing and the injection duration may be determined based, at least in part, on a charge pressure in the main chamber. The injection timing and injection duration may be optimized for a plurality of desired engine speeds and a plurality of desired load conditions. According to the optimized injection timings and durations for each desired speed and condition, different fueling levels in the prechamber 117 may be provided via the fuel injector 107.

The method described in flowchart 800 may further include retaining fluid within the prechamber 117 and preventing fuel leakage out of the prechamber 117 using pressure in the main chamber 103 during the compression stroke 410 of the piston 104. Additionally, passively fueling the prechamber 117 may include increasing the velocity and turbulence of the fuel in the prechamber 117 (e.g., by injecting the sprayed fuel from the fuel injector 107 into the prechamber via a nozzle 202) to improve mixing and a burn rate of the fuel within the prechamber 117 and then jetting the fuel from the prechamber 117 into the main chamber 103 to ignite the fuel in the main chamber 103.

In one or more embodiments, the prechamber injection method depicted in flowchart 800 may be a single direct injection strategy, which includes directing fuel from the fuel injector 107 into the prechamber 117 and the main chamber 103 late in the compression stroke 410 of the piston 105. The single direct injection strategy is characterized by a fuel injection which occurs at a single time during a four-stroke cylinder cycle. Additionally, a multiple direct injection strategy, in which a fuel injection occurring multiple times during the four-stroke cylinder cycle, may also be performed. In one or more embodiments, the single direct injection strategy and the multiple direct injection strategy may also include igniting the fuel with a spark plug 118 in the prechamber 117.

The prechamber injection method may also be performed with a port fuel injection and direct injection strategy. For example, a port fuel injection (via fuel injector 108 along the intake passage 119) may be performed during the intake stroke 406 of the piston 105 and a direct injection of fuel into the main chamber 103 and the prechamber 117 may be performed late in the compression stroke 410 of the piston 105. The port fuel injection and direction injection strategy may also include igniting the fuel with a spark plug 118 in the prechamber 117.

Embodiments of the present disclosure may provide at least one of the following advantages. Passively fueling the prechamber may assist in increasing fuel velocity and turbulence within the prechamber, which increases mixing of fuel. Improved fuel mixing also improves burn rate of the fuel mixture within the prechamber, which can enhance jet momentum into the main chamber. Creating of strong turbulent jet streams from the prechamber into the main chamber leads to repeatable main chamber combustion, even under ultra-lean diluted conditions. Further, passively fueling the prechamber removes the need for a direct fuel injector within the prechamber, reducing the cost of the engine. Additionally, if a fuel injector were installed within the prechamber, the volume of the prechamber would necessarily be much larger, which can result in difficulties in maintaining a desired engine dimension, particularly when the engine is required to be small. Passively fueling the prechamber as described herein allows for all of the benefits of actively fueling the prechamber, such as lower nitrogen oxide emissions, while reducing costs and maintaining engine efficiency.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. An engine, comprising:
- an engine block having a cylinder;
- a piston movably disposed in a main chamber of the cylinder;
- a prechamber adjacent to and in fluid communication with the main chamber via a prechamber nozzle; and
- a fuel injector having a plurality of spray nozzles in fluid communication with the main chamber, the plurality of spray nozzles comprising:
  - a first spray nozzle with a first spray angle; and
  - at least one second spray nozzle with a second spray angle,
  - wherein the first spray angle is larger than the second spray angle, such that the first spray angle is directed towards and aligned with the prechamber nozzle, while the second spray angle is directed towards the main chamber.

2. The engine of claim 1, wherein the cylinder has a cylinder head with a pent-roof angle between 5 and 25 degrees.

3. The engine of claim 1, further comprising a spark plug connected to and interfacing with the prechamber.

4. The engine of claim 1, wherein the prechamber further comprises at least one additional prechamber nozzle providing fluid communication between the prechamber and the main chamber.

5. The engine of claim 1, wherein the prechamber has a volume equal to between 1% and 10% of an engine clearance volume.

6. The engine of claim 1, wherein an external surface geometry of the prechamber may be selected from a group consisting of a flat surface, a concave surface, and a convex surface.

7. The engine of claim 1, wherein the prechamber is spaced a distance apart from the fuel injector.

8. A prechamber injection method, comprising:
- providing an engine comprising:
  - an engine block having a cylinder;
  - a piston movably disposed in a main chamber of the cylinder;
  - a prechamber adjacent to and in fluid communication with the main chamber via a prechamber nozzle; and
  - a fuel injector having a plurality of spray nozzles interfacing with the main chamber of the cylinder, the plurality of spray nozzles comprising:
    - a first spray nozzle with a first spray angle; and
    - at least one second spray nozzle with a second spray angle,
    - wherein the first spray angle is larger than the second spray angle, such that the first spray angle is directed towards and aligned with the prechamber nozzle, while the second spray angle is directed towards the main chamber;
- spraying fuel from the first spray nozzle at the first spray angle in a first direction towards the prechamber nozzle such that a first amount of fuel flows through the main chamber and enters the prechamber nozzle; and
- while spraying fuel from the first spray nozzle, spraying fuel from the at least one second spray nozzle at the second spray angle in a second direction, different than the first direction, into the main chamber.

9. The prechamber injection method of claim 8, further comprising:
- controlling an equivalence ratio of a fuel air mixture within the main chamber with an injection timing and an injection duration,
- wherein the injection timing and the injection duration are determined based, at least in part, on a charge pressure in the main chamber.

10. The prechamber injection method of claim 9, further comprising:
- optimizing the injection timing and the injection duration for a plurality of engine speeds and a plurality of load conditions; and
- providing different fueling levels in the prechamber based on the optimized injection timing and injection duration.

11. The prechamber injection method of claim 8, further comprising creating a consistent flow direction from the main chamber to the prechamber during a compression stroke of the piston.

12. The prechamber injection method of claim 11, further comprising retaining fluid within the prechamber and preventing fuel leakage out of the prechamber using pressure in the main chamber from the compression stroke of the piston.

13. The prechamber injection method of claim 8, further comprising:

increasing a velocity and a turbulence of the fuel in the prechamber to improve mixing and a burn rate of the fuel within the prechamber;

igniting the fuel with a spark plug in the prechamber; and jetting the fuel from the prechamber into the main chamber.

14. The prechamber injection method of claim 8, further comprising sizing the spray nozzles to achieve a desired hydraulic flow rate.

15. The prechamber injection method of claim 8, further comprising:

utilizing a single direct injection strategy during a late compression stroke of the piston;

wherein the single direct injection strategy comprises directing the fuel from the fuel injector into the prechamber and the main chamber a single time during a four-stroke cylinder cycle; and igniting the fuel with a spark plug in the prechamber.

16. The prechamber injection method of claim 8, further comprising:

injecting fuel into the main chamber and the prechamber during an intake stroke of the piston;

injecting fuel into the main chamber and the prechamber during a late compression stroke of the piston; and igniting the fuel with a spark plug in the prechamber.

17. The prechamber injection method of claim 8, further comprising:

performing a port fuel injection during an intake stroke of the piston;

performing a direct injection of fuel into the main chamber and the prechamber during a late compression stroke of the piston; and igniting the fuel with a spark plug in the prechamber.

18. The engine of claim 1, wherein the first spray angle ranges from about 100 to 130 degrees and the second spray angle ranges from about 30 to 90 degrees.

19. The prechamber injection method of claim 8, wherein the first spray angle ranges from about 100 to 130 degrees and the second spray angle ranges from about 30 to 90 degrees.

* * * * *